United States Patent Office 3,106,564
Patented Oct. 8, 1963

3,106,564
1-(2-PHENOXY-2-PHENYLETHYL)PYRROLIDINE
Robert W. Fleming, Ann Arbor, and Yvon J. L'Italien, Plymouth, Mich., assignors to Parke, Davis & Company, Detroit, Mich., a corporation of Michigan
No Drawing. Original application Aug. 21, 1958, Ser. No. 756,309. Divided and this application Mar. 28, 1961, Ser. No. 98,783
3 Claims. (Cl. 260—326.5)

The present invention relates to 2-phenoxy-2-phenylethylamines, to cyclic analogs thereof, to acid-addition salts of these compounds and to methods for their production.

The novel compounds of this invention can be represented, as their free bases, by the structural formula

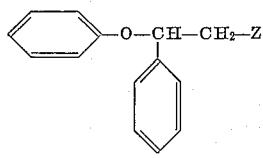

In this formula, Z can represent mono-(lower)alkylamino, di-(lower)alkylamino, pyrrolidino, piperidino, (lower)alkylpyrrolidino or (lower)alkylpiperidino. The lower alkyl radicals are those containing not more than 6 carbon atoms such as methyl, ethyl, propyl, butyl, amyl, hexyl or branched-chain isomers of the foregoing.

Compounds of the present invention are produced by the reduction of the carbonyl group of an amide of the formula

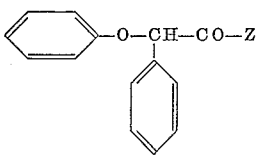

wherein Z is defined as before. A variety of reducing agents can be used for this purpose. For example, the reduction can be carried out by using a hydride reducing agent such as lithium aluminum hydride. The reduction is carried out by treating the amide with lithium aluminum hydride in an unreactive solvent such as ether, tetrahydrofuran, dioxane or diethylene glycol dimethyl ether. Other unreactive solvents as well as mixtures of such solvents can also be used. Neither the exact proportion of the reactants nor the reaction time and temperature are critical variables, although in general it is satisfactory to use a slight or moderate excess of lithium aluminum hydride and to carry out the reaction between room temperature and 100° C. for up to a few hours. The desired reduction product is obtained by decomposition of the reaction mixture with an aqueous medium and is isolated either as the free base or as an acid-addition salt. The reduction can also be carried out with a variety of reducing agents other than lithium aluminum hydride. For example, other alkali metal aluminum hydrides can be used or the reduction can be carried out by catalytic hydrogenation under high pressure with a copper-chromium oxide (copper chromite) catalyst.

The amides required as starting materials in this process can be prepared by the reaction of an α-halophenylacetyl halide with an amine under mild conditions, followed by condensation of the resulting α-halophenylacetamide with an alkali metal phenoxide with the formation of the α-phenoxyphenylacetamide which is then reduced as described hereinbefore. For example, α-bromophenylacetyl chloride, prepared by the bromination of phenylacetyl chloride, is reacted with diethylamine at about —10° C. Temperatures below 0° C. are generally preferred for this reaction in order to minimize the formation of by-products which would result from the reaction of the α-halogen atom. The N,N-diethyl-α-bromophenylacetamide is then reacted with sodium phenoxide to form N,N-diethyl-α-phenoxyphenylacetamide which gives N,N-diethyl-2-phenoxy-2-phenylethylamine upon reduction. In place of the diethylamine in this reaction sequence, it is also satisfactory to use other dialkylamines, monoalkylamines or cyclic amines such as pyrrolidine, piperidine and their alkylated derivatives.

The N-alkyl and N,N-dialkyl derivatives of this invention can also be produced by alkylating the amino group of a compound having the formula

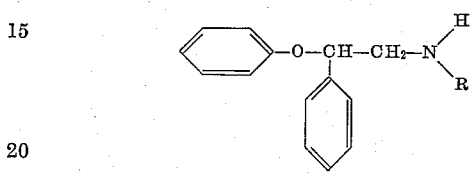

where R represents hydrogen or a lower alkyl radical. The alkylation can be carried out directly by reaction with an alkyl halide, sulfate or sulfonate; methylation can be accomplished by reaction with a mixture of formaldehyde and formic acid. The alkylation can also be carried out in a step-wise fashion by first preparing an acyl derivative of the amine by reaction with a carboxylic acid anhydride or halide and then reducing the carbonyl group in the resulting amido compound. This reduction can be carried out, for example, by reacting the amido compound with lithium aluminum hydride under anhydrous conditions in an unreactive solvent such as ether, tetrahydrofuran or benzene followed by decomposing the primary reaction product with an aqueous medium such as sodium hydroxide solution.

The free bases of this invention form non-toxic acid-addition salts with a variety of inorganic and organic acids such as hydrochloric, hydrobromic, hydriodic, sulfuric, acetic, benzoic, citric, maleic, malic, gluconic, ascorbic and related acids. Such acid-addition salts, formed by admixture of the free base with the selected acid, are equivalent to the free bases for purposes of this invention and in certain applications are preferred because of their higher water solubility.

The compounds of this invention are useful pharmacological agents exhibiting activity on the central nervous system. They are central nervous system stimulants finding useful application as analeptic agents without significant effect on respiration. They also exhibit a high order of activity as anti-histaminic and anti-cholinergic agents and are of value in the treatment of tremor states.

This is a division of our co-pending application, Serial No. 756,309, filed August 21, 1958, now abandoned.

The invention is illustrated, but not limited by the following examples.

*Example 1*

A solution of 56 g. of α-bromophenylacetyl chloride in an equal volume of carbon tetrachloride is chilled to —10° C. with an external cooling bath and treated with a solution of 40 g. of diethylamine in 100 ml. of carbon tetrachloride added at such a rate as to keep the temperature at about —10° C. throughout the addition. About 1½ hours is required for this addition, following which the reaction mixture is allowed to stand for one more hour. The mixture is washed with water and the separated organic phase is rendered anhydrous and distilled under reduced pressure to leave a residue of crude N,N-diethyl-α-bromophenylacetamide suitable for use without further purification.

To a stirred solution of sodium phenoxide prepared by the portion-wise addition of 12.4 g. of sodium methoxide to 100 ml. of absolute ethanol containing 17.4 g. of phenol is gradually added the crude N,N-diethyl-α-bromophenylacetamide. The mixture is heated under reflux for 16 hours and then cooled. The sodium bromide which forms during the reaction is removed by filtration and the residue obtained by evaporating the filtrate to dryness is recrystallized from methanol to afford N,N-diethyl-α-phenoxyphenylacetamide, M.P. about 101–102° C.

A solution of 23 g. of N,N-diethyl-α-phenoxyphenylacetamide in 200 ml. of benzene is slowly added to a stirred solution or suspension of 4 g. of lithium aluminum hydride in 500 ml. of ether. The mixture is heated under reflux for one hour and, after cooling, is decomposed by the successive addition of 4 ml. of water, 3 ml. of 20% sodium hydroxide solution and 14 ml. of water. The mixture is filtered and the filtrate is concentrated to a small volume, diluted with a small quantity of isopropyl alcohol and treated with a slight excess of hydrogen chloride in isopropyl alcohol. Crystallization is induced by adding ether and chilling. The product which separates is collected and recrystallized from a mixture of isopropyl alcohol and ether to give N,N-diethyl-2-phenoxy-2-phenylethylamine hydrochloride, M.P. about 149–150° C.

The free base, obtained by making an aqueous solution of the hydrochloride basic with sodium hydroxide and extracting with ether, has the structural formula

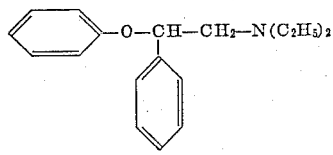

*Example 2*

α-Bromophenylacetyl chloride (56 g.) is slowly added to a stirred mixture of 55 ml. of 30% methylamine in water and 175 ml. of ethylene dichloride, maintained at about −10° C. with an external cooling bath. Precipitated ammonium salts are then dissolved by the addition of water and the insoluble product is collected on a filter and recrystallized from ethanol. This compound is N-methyl-α-bromophenylacetamide, M.P. about 101–102° C.

To a stirred solution of sodium phenoxide prepared from 16.5 g. of phenol and 10 g. of sodium methoxide in 400 ml. of ethanol is added 39 g. of N-methyl-α-bromophenylacetamide. The reaction mixture is heated under reflux for 16 hours. Precipitated sodium bromide is removed by filtration and the filtrate is concentrated until crystallization of the product begins. The chilled mixture is then filtered, yielding N-methyl-α-phenoxyphenylacetamide, M.P. about 125–126° C.

A solution of 20.12 g. of N-methyl-α-phenoxyphenylacetamide in 50 ml. dioxane and 200 ml. of benzene is added to a stirred suspension of 6 g. of lithium aluminum hydride in 500 ml. of ether. The mixture is heated under reflux for 3 hours, cooled and then decomposed by the successive addition of 6 ml. of water, 4.5 ml. of 20% sodium hydroxide solution and 21 ml. of water. The reaction mixture is diluted with ether and filtered. The filtrate is concentrated to a small volume. Unreduced amide which may separated at this point is removed by filtration. The filtrate is diluted with an additional quantity of ether and treated with a slight excess of hydrogen chloride in isopropyl alcohol. The precipitated product is collected on a filter and recrystallized from isopropyl alcohol. It is N-methyl-2-phenoxy-2-phenylethylamine hydrochloride, M.P. about 209–210° C.

The free base is obtained by treating an aqueous solution of the hydrochloride with potassium bicarbonate, extracting with ether and recovering the product from the ether phase. It has the structural formula

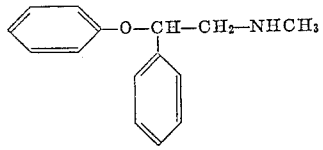

A water-soluble citrate is obtained by mixing methanolic solutions of the free base and citric acid and concentrating the mixture to a small volume.

*Example 3*

A mixture of 10 g. of 2-phenoxy-2-phenylethylamine, 5.1 ml. of acetic anhydride and 100 ml. of benzene is allowed to stand for 20 hours at about 25° C. and is then heated under reflux for 45 minutes. The cooled mixture is washed successively with water, with dilute hydrochloric acid and with dilute potassium bicarbonate solution. The separated benzene phase is made anhydrous and evaporated to dryness. The residue obtained is crude N-acetyl-2-phenoxy-2-phenylethylamine, suitable for use in the following reaction without further purification. A solution of 10 g. of this product in the minimum quantity of benzene is added gradually to a stirred suspension of 2.8 g. of lithium aluminum hydride in 350 ml. of ether. This mixture is heated under reflux for 3 hours and then decomposed by the successive addition of 2.8 ml. of water, 2.1 ml. of 20% sodium hydroxide solution and 10.5 ml. of water. The mixture is then filtered, concentrated to a small volume and treated with a slight excess of hydrogen chloride in isopropyl alcohol. Ether is added and the insoluble product is collected on a filter. It is N-ethyl-2-phenoxy-2-phenylethylamine hydrochloride. The free base is obtained by making an aqueous solution of this compound basic and extracting with ether. It has the structural formula

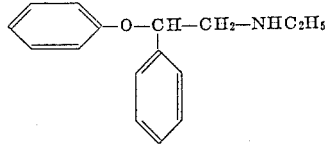

The 2-phenoxy-2-phenylethylamine used as a starting material can be obtained as follows. A stirred mixture of 37 ml. of concentrated aqueous ammonia and 175 ml. of ethylene dichloride maintained at −10° C. is treated gradually with 56 g. of α-bromophenylacetyl chloride. Water is then added to dissolve the precipitated ammonium salts. The reaction product, which is insoluble in both phases, is collected on a filter and recrystallized from ethanol to afford α-bromophenylacetamide, M.P. about 144–146° C.

To a stirred solution of sodium phenoxide prepared from 18.8 g. of phenol and 15 g. of sodium ethoxide in 200 ml. of ethanol there is gradually added a solution of 42 g. of α-bromophenylacetamide in 300 ml. of hot ethanol. The reaction mixture is heated under reflux for 18 hours. It is then filtered and the filtrate is concentrated until precipitation of the product begins. The mixture is then chilled and the solid product collected on a filter. By recrystallization from aqueous ethanol there is obtained α-phenoxyphenylacetamide, M.P. 156–157° C.

A solution of 22.3 g. of α-phenoxyphenylacetamide in 50 ml. of dioxane and 200 ml. of benzene is gradually added to a stirred suspension of 6 g. of lithium aluminum hydride in 500 ml. of ether. The mixture is heated under reflux for 3 hours, allowed to stand at room temperature for 16 hours and then decomposed by the successive addition of 4 ml. of water, 3 ml. of 20% sodium hydroxide solution and 14 ml. of water. The filtered reaction mixture is concentrated to a small volume, clarified by refiltration and acidified with a slight excess of hydrogen chloride in isopropyl alcohol. Ether is added for complete separation of the product which is then collected on a filter and recrystallized from isopropyl alcohol. The compound is 2-phenoxy-2-phenylethylamine hydrochloride, M.P. about 216–217° C. The free base can be obtained by making an aqueous solution of the hydrochloride basic with sodium hydroxide and extracting with ether.

*Example 4*

A solution of 57.3 g. of α-bromophenylacetyl chloride in 200 ml. of carbon tetrachloride, maintained at about —10° C. is treated gradually with 19 g. of isopropylamine. The mixture is then allowed to warm to room temperature and is washed with water. The separated organic phase is dried and then distilled under reduced pressure. By complete removal of the solvent, there is obtained a residue of N-isopropyl-α-bromophenylacetamide, suitable for use without further purification.

Phenol (13.2 g.) is added to a solution of 3.3 g. of sodium in 200 ml. of anhydrous methanol. To this solution is added, with continuous stirring, 36 g. of crude N-isopropyl-α-bromophenylacetamide, prepared as described. The mixture is heated under reflux for 20 hours and then evaporated almost to dryness. The residual slurry is partitioned between benzene and water. The separated benzene phase is washed with water and with dilute sodium hydroxide solution, rendered anhydrous and evaporated to dryness. By crystallization of the residue from ether, there is obtained N-isopropyl-α-phenoxyphenylacetamide, M.P. about 100–101° C.

To a stirred mixture of 4 g. of lithium aluminum hydride and 750 ml. of ether is gradually added a solution of 20 g. of N-isopropyl-α-phenoxyphenylacetamide in 450 ml. of dioxane. The mixture is then heated under reflux for 3 hours following which it is cooled and decomposed by the successive addition of 4 ml. of water, 3 ml. of 20% sodium hydroxide solution and 14 ml. of water. The mixture is filtered and the filtrate is concentrated to a small volume, diluted with isopropyl alcohol and treated with a slight excess of hydrogen chloride in isopropyl alcohol. Ether is added for complete separation of the product which is then collected on a filter and recrystallized from a mixture of isopropyl alcohol and ether. This compound is N-isopropyl-2-phenoxy-2-phenylethylamine hydrochloride, M.P. about 196–197° C. The free base has the structural formula

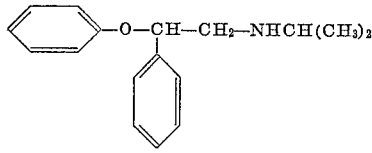

*Example 5*

A stirred mixture of 30 g. of N-methyl-2-phenoxy-2-phenylethylamine, 20 ml. of absolute formic acid and 12 g. of 38% formaldehyde is heated at about 90–100° C. for 3 hours. The chilled mixture is diluted with 150 ml. of ether and treated with an excess of 5-normal sodium hydroxide solution. The desired product is separated by extraction with several portions of ether and the combined ethereal extract is dried and treated with a slight excess of hydrogen chloride in isopropyl alcohol. The precipitated product, N,N-dimethyl-2-phenoxy-2-phenylethylamine hydrochloride, is collected on a filter and washed with ether.

The free base is precipitated from an aqueous solution of the hydrochloride by the addition of sodium hydroxide. This free base has the structural formula

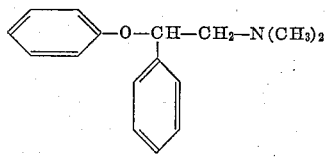

*Example 6*

Piperidine (46.8 g.) is gradually added to a stirred solution of 56 g. of α-bromophenylacetyl chloride in 100 ml. of carbon tetrachloride maintained at —10° C. with an external cooling bath. The mixture is allowed to warm to room temperature and is then washed with water. The separated organic phase is dried and then distilled under reduced pressure to afford a residue of crude 1-(α-bromophenylacetyl)piperidine, suitable for use without further purification.

This crude 1-(α-bromophenylacetyl)piperidine is gradually added to a stirred solution of sodium phenoxide prepared from 26.2 g. of phenol and 16.0 g. of sodium methoxide in 800 ml. of absolute ethanol. The reaction mixture is heated under reflux for 20 hours and then cooled and filtered. The filtrate is concentrated to about one-half of its original volume and then cooled and again filtered. The crude product obtained in this operation and by further concentration of the filtrate is recrystallized from aqueous ethanol to give 1-(α-phenoxyphenylacetyl)piperidine, M.P. about 119–120° C.

To a stirred mixture of 4 g. of lithium aluminum hydride and 500 ml. of ether is slowly added a solution of 29.5 g. of 1-(α-phenoxyphenylacetyl)piperidine in 200 ml. of benzene. The reaction mixture is heated under reflux for 2 hours and then cooled and decomposed by the successive addition of 4 ml. of water, 3 ml. of 20% sodium hydroxide solution and 14 ml. of water. The mixture is filtered and the filtrate is concentrated to a small volume and treated with a slight excess of hydrogen chloride in isopropyl alcohol. If more complete separation of the product is desired, ether is added. The product is then collected and recrystallized from a mixture of isopropyl alcohol and ether to give 1-(2-phenoxy-2-phenylethyl)piperidine hydrochloride, M.P. about 195–196° C. The free base, obtained as in the previous examples, has the structural formula

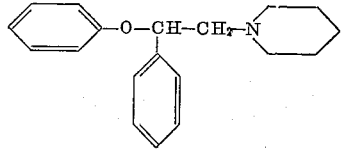

By the foregoing procedure, with the substitution of 62.2 g. of 2,6-dimethylpiperidine for the piperidine in the reaction with α-bromophenylacetyl chloride, followed by conversion of the resulting crude 1-(α-bromophenylacetyl)-2,6-dimethylpiperidine with sodium phenoxide and reduction of the 1-(α-phenoxyphenylacetyl)-2,6-dimethylpiperidine with lithium aluminum hydride, the product obtained is 1-(2-phenoxy-2-phenylethyl)-2,6-dimethylpiperidine, conveniently isolated as the ether-insoluble hydrochloride.

*Example 7*

Bromine (160 g.) is added drop-wise with stirring to 154.6 g. of phenylacetyl chloride, initially heated to 125–130° C. As soon as decolorization of the first few drops of bromine has occurred, the external heating is discontinued and the mixture is maintained under irradiation from a flood lamp. After the addition of the bromine has been completed, the mixture is stirred under reduced pressure for about 2 hours in order to remove hydrogen bromide. The remaining product is crude α-bromophenylacetyl chloride.

The α-bromophenylacetyl chloride as thus obtained is dissolved in 1000 ml. of carbon tetrachloride. To this solution, continuously stirred and maintained at about −5 to −10° C., is gradually added 142 g. of pyrrolidine. When the addition has been completed, 300 ml. of cold water is slowly added and, after thorough mixing, the organic phase is separated, washed with 200 ml. of water and dried over anhydrous magnesium sulfate. The solid product recovered by evaporation of the solvent is melted and poured with vigorous stirring into 1500 ml. of petroleum ether. The crystalline product which separates is collected on a filter. It is 1-(α-bromophenylacetyl)pyrrolidine, M.P. about 71–72° C.

Phenol (78 g.) is added to a solution of 19 g. of sodium in 1000 ml. of anhydrous methanol. To this solution is added with stirring the 1-(α-bromophenylacetyl)pyrrolidine prepared in the manner just described. The mixture is heated under reflux for 20 hours and then evaporated to a thick slurry. The residue is partitioned by the addition of 700 ml. of water and extraction with two 500 ml. portions of benzene. The combined organic phase is washed with water and with dilute sodium hydroxide solution, dried over anhydrous magnesium sulfate and evaporated to a thick syrup which solidifies on standing. A solution of this product in hot acetone is decolorized with activated charcoal, filtered and diluted with water just short of the point at which a persistent turbidity is formed. The product obtained by cooling is collected on a filter. It is 1-(α-phenoxyphenylacetyl)pyrrolidine, M.P. about 113–114° C.

To a stirred solution of 3.8 g. of lithium aluminum hydride in 750 ml. of ether is added a solution of 28 g. of 1-(α-phenoxyphenylacetyl)pyrrolidine in 400 ml. of dioxane. When the evolution of heat subsides, some of the ether is removed by distillation, and the remaining mixture is heated under reflux at about 55° C. for 16 hours. The mixture is then cooled, diluted with 400 ml. of ether and decomposed by the successive addition of 4 ml. of water, 3 ml. of 20% sodium hydroxide solution and 14 ml. of water. By filtration through diatomaceous earth and concentration under a vacuum, the crude product is obtained as a syrupy residue. Fractional distillation affords 1-(2-phenoxy-2-phenylethyl)pyrrolidine, B.P. about 145–150° C. at 1.0–0.8 mm. This compound has the structural formula

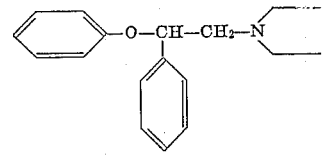

A solution of this free base in ether is treated with a slight excess of hydrogen chloride in isopropyl alcohol. The crude product is collected on a filter and recrystallized from isopropyl alcohol containing a small quantity of ether. This compound is the water-soluble hydrochloride, M.P. about 196–197° C.

By the foregoing procedure, with the substitution of 170 g. of 2-methylpyrrolidine for the pyrrolidine, followed by reaction of the resulting 1-(α-bromophenylacetyl)-2-methylpyrrolidine with sodium phenoxide and reduction of the 1-(α-phenoxyphenylacetyl)-2-methylpyrrolidine thus formed with lithium aluminum hydride, the compound obtained is 1-(2-phenoxy-2-phenylethyl)-2-methylpyrrolidine. This free base is converted to a water-soluble hydrobromide by treating an ethereal solution with hydrogen bromide in isopropyl alcohol.

We claim:
1. 1-(2-phenoxy-2-phenylethyl)pyrrolidine.
2. 1-(2-phenoxy-2-phenylethyl)pyrrolidine hydrochloride.
3. A member of the class consisting of 1-(2-phenoxy-2-phenylethyl)pyrrolidine and non-toxic acid-addition salts thereof.

References Cited in the file of this patent

Wilson et al.: Organic Chemistry in Pharmacy, 1949, pp. 221–232. J. B. Lippincott Company.
Kopp: Comptes Rendus, vol. 235, pp. 247–249 (1952).
Merck Index, Sixth Edition, pp. 388–389 (1952).